D. P. SMALL.
ANTISKID DEVICE.
APPLICATION FILED OCT. 3, 1918.
1,403,270.
Patented Jan. 10, 1922.
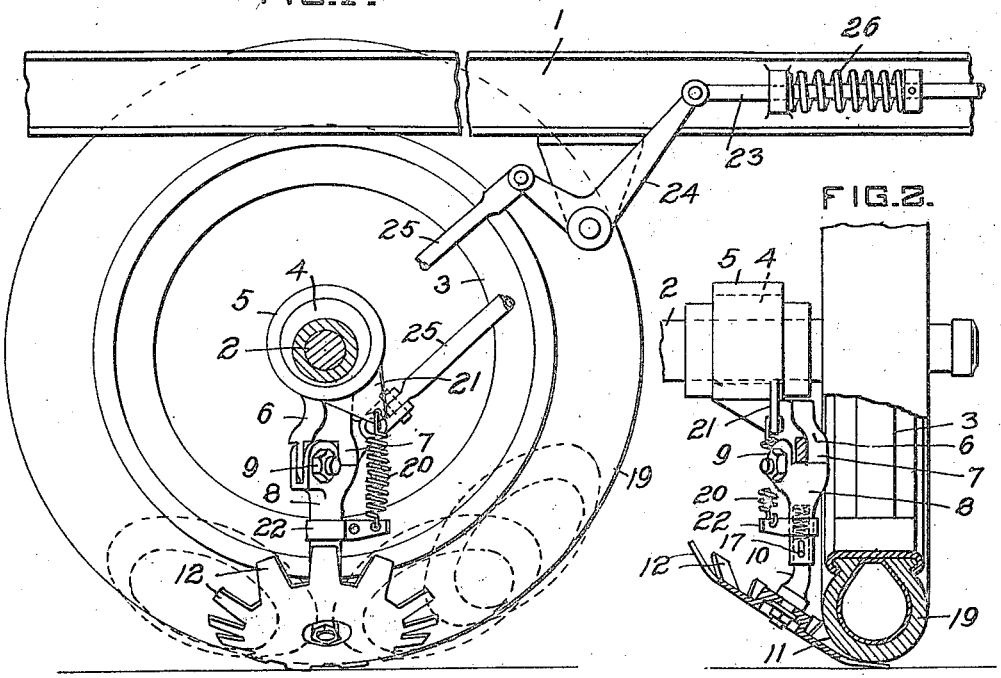
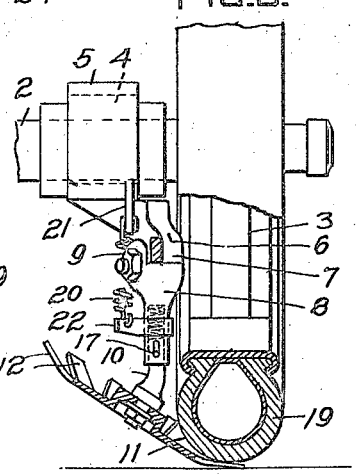
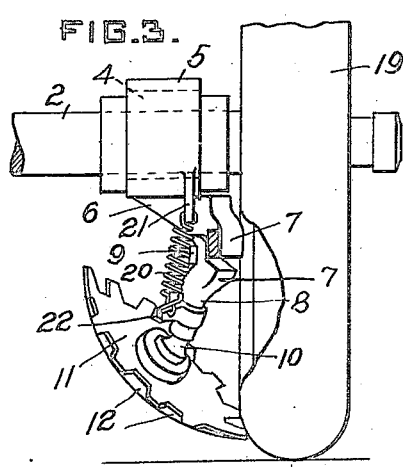
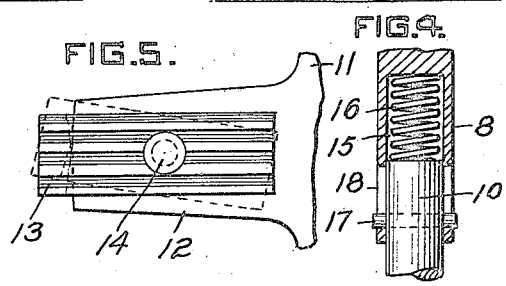
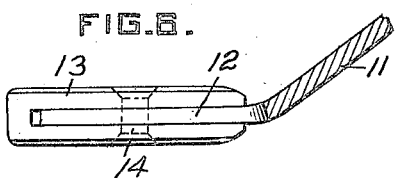
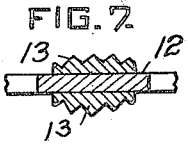

UNITED STATES PATENT OFFICE.

DAVID P. SMALL, OF PITTSBURGH, PENNSYLVANIA.

ANTISKID DEVICE.

1,403,270. Specification of Letters Patent. Patented Jan. 10, 1922.

Application filed October 3, 1918. Serial No. 256,659.

*To all whom it may concern:*

Be it known that I, DAVID P. SMALL, a citizen of the United States, residing at Pittsburgh, in the county of Allegheny and State of Pennsylvania, have invented a new and useful Improvement in Antiskid Devices, of which improvement the following is a specification.

My invention relates to devices for preventing the wheels of vehicles, particularly automobiles, from skidding. The said devices are commonly called antiskid devices, and the object of my invention is to produce a device of this character having a metallic surface, which can, at the will of the chauffeur or operator, be positively and quickly inserted or interposed between the tread of the vehicle and the ground, thereby preventing the wheels of the vehicle from skidding.

I accomplish this by means of the device hereinafter more specifically described, reference being had to the accompanying drawings, in which:

Fig. 1 is a side elevation of the wheel of a vehicle, showing my antiskid device applied thereto and in operative position.

Fig. 2 is a front elevation of the same, partly in section.

Fig. 3 is a fragmentary elevation of the wheel and axle showing my device applied thereto and in inoperative position.

Fig. 4 is an enlarged view partly in section of the connected sections of the shaft carrying the antiskid disk.

Fig. 5 is a fragmentary enlarged plan view of a modified form of the antiskid prong.

Fig. 6 is a side elevation, partly in section, of the same.

Fig. 7 is an enlarged sectional view of the same, showing the corrugated or serrated upper and lower surfaces thereof.

Referring to the drawings, the numeral 1 designates a portion of the chassis of an ordinary automobile, and 2 the axle upon which is mounted the wheel 3. An eccentric 4 is applied to the axle 2 and a ring 5 is loose upon this eccentric, said ring being provided with a downwardly extending arm 6 which is rigid therewith. A leg 8 is pivotally connected to the arm 6 by means of a pivot bolt 9, the pivot ends of the arm 6 and leg 8 being formed with stop shoulders 7 which abut against each other to limit the swinging movement of the leg 8 when it has been swung downwardly into alinement with the arm 6.

The lower end of the leg 8 is formed with a socket 15 which receives a plunger 10, a spring 16 being interposed between the base of the socket and the plunger, said spring acting to normally force the plunger outwardly, and the movements of the plunger being limited by a transverse pin 17 which passes through the same and has the ends thereof received within slots 18 formed in the side walls of the recess or socket 15. The lower end of the plunger 10 is deflected outwardly and has the antiskid disk 11 revolubly mounted thereon. The said disk 11 is so arranged on an angle to the plane of the wheel so that it may be interposed between the tire and the ground to prevent skidding, the said disk being provided at its periphery with a series of radially projecting fingers or prongs 12.

When the leg is swung downwardly into a substantially vertical position, as indicated by Figures 1 and 2, the anti-skid disk 11 is brought into operative position and the prongs or fingers 12 thereof project under the tire 19 so as to be interposed between the said tire and the surface of the road. The upper and lower surfaces of the fingers 12 may be serrated or corrugated or, as shown by Figures 5, 6 and 7, clips 13 having corrugated upper and lower faces may be fitted upon the fingers 12 and connected thereto by rivets 14 so that they are free to have a limited swinging or oscillating movement thereon. When the anti-skid disk is in operative position and the fingers 12 thereof project between the tire 19 and the surface of the road, it will be obvious that skidding will be effectively prevented, and the limited telescoping action of the plunger 10 in the recess 15 enables the device to adjust itself automatically for a partially or wholly deflated tire.

A tension spring 20 connects an ear 21 projecting from the ring 5 to a lug 22 projecting latterly from the leg 8, and this spring normally tends to swing the leg 8 into alinement with the arm 6 so that the two stop shoulders 7 upon the respective members are held in engagement with each other, thereby providing a continuous and firm supporting member for the anti-skid disk.

A draw rod 23 is shown as slidably mounted upon the chassis 1, the rear end thereof being connected to one arm of a bell crank lever 24 and the other arm of the said bell crank lever being connected by a rod 25 to the arm 6. By pulling this draw rod 23 and locking it by any suitable locking mechanism (not shown), the arm 6 is swung downwardly into a substantially vertical position and the anti-skid disk 11 brought into operative position, as indicated by Figures 1 and 2. When the locking mechanism is released, the friction of the tire upon the disk moves said disk toward the rear of the wheel and out of anti-skidding contact with the tire, whereupon the spring 26, which is mounted upon the draw rod 23, operates to swing the anti-skid disk forwardly toward the front of the wheel, as indicated by dotted lines at the right hand side of Figure 1. The eccentric mounting of the ring 5 on the axle serves to lengthen the effective reach of the parts carrying the anti-skid disk as it is swung forwardly, thereby enabling it to automatically assume its normal inoperative position and be in readiness to be again operated to produce an anti-skid action.

Having described my invention, what I claim and desire to secure by Letters Patent, is:

1. The combination with a vehicle and its wheel, of an anti-skid disk arranged at an inclination to the plane of the wheel and formed with a peripheral portion adapted to be interposed between the wheel and the road, a swinging arm connected to the disk, means for moving the swinging arm to throw the disk into and out of operative position, and a cam mounting for the swinging arm whereby the effective length thereof is increased as the arm is moved to bring the disk into inoperative position.

2. The combination with a vehicle and its wheel, of an anti-skid disk arranged at an inclination to the plane of the wheel and formed with a peripheral portion adapted to be interposed between the tread of the wheel and the surface of the road, a swinging arm connected to the disc, means for moving the swinging arm to throw the disc into and out of operative position, and a cam mounting for the swinging arm whereby the effective length thereof is increased as the arm is moved to bring the disc into inoperative position, roughened clips loosely fitted upon the peripheral portion of the disk, and supporting means for the disk.

In testimony whereof, I have hereunto signed my name in the presence of two subscribing witnesses.

DAVID P. SMALL.

In the presence of—
CLARENCE A. WILLIAMS,
JOHN H. RONEY.